(12) United States Patent
Bajorat et al.

(10) Patent No.: US 10,759,536 B2
(45) Date of Patent: Sep. 1, 2020

(54) POWER CONTROL ARRANGEMENT

(71) Applicant: Airbus Operations GmbH, Hamburg (DE)

(72) Inventors: Falk Bajorat, Hamburg (DE); Olaf Schlatter, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 332 days.

(21) Appl. No.: 15/944,379

(22) Filed: Apr. 3, 2018

(65) Prior Publication Data
US 2018/0281958 A1 Oct. 4, 2018

(30) Foreign Application Priority Data

Apr. 4, 2017 (EP) ..................... 17164810

(51) Int. Cl.
| | | |
|---|---|---|
| *B64D 11/04* | (2006.01) | |
| *B64D 11/00* | (2006.01) | |
| *H01M 8/04858* | (2016.01) | |
| *H02J 13/00* | (2006.01) | |
| *H02J 3/14* | (2006.01) | |

(52) U.S. Cl.
CPC .......... *B64D 11/04* (2013.01); *B64D 11/0007* (2013.01); *H01M 8/04925* (2013.01); *H02J 13/00* (2013.01); *B64D 2221/00* (2013.01); *H02J 3/14* (2013.01); *H02J 13/00019* (2020.01); *H02J 13/0062* (2013.01); *H02J 13/0075* (2013.01); *Y02T 50/46* (2013.01)

(58) Field of Classification Search
CPC ................ B64D 11/04; B64D 11/0007; B64D 2221/00; H01M 8/04925; H02J 3/00; H02J 3/00019; H02J 3/14; H02J 13/0062; H02J 13/0075; Y02T 50/46
See application file for complete search history.

(56) References Cited

U.S. PATENT DOCUMENTS

| | | |
|---|---|---|
| 2011/0266864 A1 | 11/2011 | McAvoy |
| 2013/0033789 A1 | 2/2013 | Aronson et al. |
| 2016/0244168 A1 | 8/2016 | Godecker et al. |

FOREIGN PATENT DOCUMENTS

| | | |
|---|---|---|
| WO | WO 2013/136286 A2 | 9/2013 |
| WO | WO 2013/142790 A2 | 9/2013 |

OTHER PUBLICATIONS

European Search Report for Application No. 17164810 dated Jun. 7, 2017.

*Primary Examiner* — Robert L Deberadinis
(74) *Attorney, Agent, or Firm* — Jenkins, Wilson, Taylor & Hunt P.A.

(57) ABSTRACT

A power control arrangement for an aircraft galley including a power control unit and an interface unit. A power input of the power control unit includes a main switch and connects to a power feed. Each of a power outlets of the power control unit includes an outlet switch and connects to a galley insert. A main switch interface on the interface unit is provided for switching of the main switch. Each outlet switch interface of the interface unit is associated with one of the outlet switches for switching the outlet switch. The interface unit is arranged remote from the power control unit and the switch interfaces are connected to the corresponding switch via an electrical, radio or optical connection for controlling switching of the switches. Further, an aircraft galley and an aircraft are disclosed.

14 Claims, 2 Drawing Sheets

POWER CONTROL ARRANGEMENT

CROSS-REFERENCE TO RELATED APPLICATION

This application claims priority to European Patent Application No. 17164810.8 filed Apr. 4, 2017, the entire disclosure of which is incorporated by reference herein.

TECHNICAL FIELD

The present disclosure is directed to a power control arrangement for an aircraft galley comprising a power control unit and an interface unit.

BACKGROUND

Power control arrangements are used in aircraft galleys to control and distribute the electrical power received from an aircraft's power feed to the different galley inserts. An aircraft galley can be understood as a rack or shelf providing a plurality of receptacles or compartments for receiving appliances also referred to as galley inserts. Galley inserts include, for example, steam ovens, coffee makers and refrigerators. Which galley inserts are used in a galley differs from aircraft to aircraft and frequently also changes over the lifetime of an aircraft. For example, if the same aircraft is used on short-haul flight where only drinks and snacks are served it requires different galley inserts as if it is used on mid-range flights where warm meals are served.

The power control arrangement is commonly a box placed in one of the compartments of the galley. Inside the box electrical elements such as switches and circuit breakers are placed. These form together with the power input and the power outlets the power control unit of the power control arrangement. The switches and circuit breakers can be controlled by a distribution board or breaker panel providing mechanical interfaces to the switches and circuit breakers. This breaker panel forms the interface unit. Hence, the part of a switch that can be actuated by a user is placed on the circuit breaker panel and the electrical part of the switch or circuit breaker is placed right beneath. The breaker panel forms the visible side of the box, i.e., the breaker panel is the front cover of the housing of the power control arrangement.

Power control arrangements inter alia comprise a main switch. The main switch is provided for turning the power supply on and off by enabling and disabling power supply from the power feed of the aircraft. A mechanical switch is provided on the interface unit of the power control arrangement which can be used by a crew member of the aircraft to turn the power supply on and off. Since the switch needs to be accessible to the aircraft crew at any time, the power control arrangement including its interface unit need to be mounted on the galley in a compartment that is readily accessible to the aircraft's crew.

The power control arrangements further comprise a plurality of power outlets for connecting different galley inserts to the power control arrangements. For safety reasons each power outlet is provided with a circuit breaker. The circuit breakers need to be adapted or configured to the power requirements of the galley insert connected to the respective power outlet. For example, a steam oven for heating food has a different power requirement than a refrigerator unit. Hence, the power control arrangement needs to be installed such that the circuit breakers can be easily exchanged whenever a galley insert is replaced. Further, the breaker panel which serves as the interface unit comprises a switch for each circuit breaker enabling a crew member to reconnect a galley insert after power to the galley insert has been cut by the circuit breaker.

The power control arrangement is also used to distribute the power from the power feed of the aircraft to the different galley inserts. However, the power control arrangement is not a purely passive power distributor but needs to be actively controlled by the crew of an aircraft since the total electric power available for a galley may not be sufficient to supply all galley inserts at the same time. For example, it may not be possible to supply all steam ovens simultaneously with full power if also the coffee and hot water makers are running. Thus, the power control arrangement comprises a power distributor. The power distributor can be understood as a switch which enables a crew to select subsets of galley inserts that are simultaneously supplied with electric power. Power distributors are commonly implemented in the form of rotary control switches. Since such switches are mechanical devices, they need to be readily accessible for the aircraft crew and the entire power control arrangement has to be arranged adjacent to a front section of the galley such that it is accessible to the crew. Note that the power distributor needs to be replaced or at least rewired whenever a galley insert is replaced with a different kind of galley insert.

SUMMARY

In view of the above it is an object of the present disclosure to provide an improved power control arrangement. It is further an object of the disclosure herein to provide an aircraft galley comprising an improved power control arrangement and an aircraft comprising a galley with an improved power control arrangement.

The disclosure herein provides a power control arrangement, an aircraft galley and an aircraft. The present disclosure is directed to a power control arrangement for an aircraft galley comprising a power control unit and an interface unit. The power control unit comprises a power input and a plurality of power outlets and the interface unit comprises a main switch interface and a plurality of outlet switch interfaces. The power input comprises a main switch and is provided for connecting the power control unit to an electric power feed of an aircraft for supplying electric power from the electric power feed of the aircraft to the power control unit. The main switch is selectively switchable between an enabled state and a disabled state. In the enabled state electric power can be supplied from the electric power feed though the power input to the power outlets and in the disabled state electric power cannot be supplied from the electric power feed through the power input to the power outlets. Each of the plurality of power outlets comprises an outlet switch and is provided for connecting a galley insert to the power control unit such that a galley insert connected to one of the plurality of power outlets can be supplied with electric power from the power control unit. Each outlet switch is switchable between an enabled state and a disabled state. In the enabled state of each outlet switch electric power can be supplied from the power control unit through the respective power outlet to a galley insert connected to the respective power outlet and in the disabled state of each outlet switch electric power cannot be supplied from the power control unit though the respective power outlet to a galley insert connected to the respective power outlet. The main switch interface is provided for enabling a user to control switching of the main switch between the enabled state and the disabled state. Each outlet switch interface is associated with one of the plurality of outlet switches and adapted or configured to allow a user to control switching of the associated outlet switch at least from the disabled state to the enabled state. The disclosure herein is further directed to an aircraft galley comprising a power control arrangement and an aircraft comprising a galley with a power control arrangement.

In a first aspect the disclosure herein provides a power control arrangement of the kind described above, wherein the interface unit is arranged remote from the power control unit and wherein the main switch interface is connected to the main switch via an electrical, radio or optical connection for controlling switching of the main switch and each of the outlet switch interfaces is connected to the associated outlet switch via an electrical, radio or optical connection for controlling switching of the associated outlet switches.

In other words, according to the disclosure herein the power control arrangement of the interface unit does not form part of the cover of the housing of the power control unit. Instead, the power control unit and the interface unit are distinct elements that are installed remote from one another in the aircraft galley. For example, the power control unit can advantageously be placed in a rear section of the galley away from that part of the galley that is visible to a user. This allows the power control unit to be installed directly adjacent to the main power feed of the aircraft. Thus, the power supply lines between the power input and the power feet can be kept shorter. Shorter power lines are lighter and easier to install since that take up little to no space. The power control unit may be placed, for example, in the rear section of a compartment of the galley and in the front section of the compartment another galley insert may be installed which does not require the full depth of the compartment.

The interface unit can be placed at the front section of the galley such that it is accessible to a user, i.e., a member of the aircraft's crew. The interface unit provides a user with a main switch interface and a plurality of outlet switch interfaces which enable a user to control the main switch and outlet switches of the power control unit. Since the interface unit is placed remote from the power control unit, the interactions of a user with the main switch interface or one of the plurality of outlet switches need to be transmitted to the power control unit. According to the disclosure herein, each of the interfaces is connected to the respective switch in the power control unit via an electrical connection, a radio connection or an optical connection. The connection may be an analog connection requiring, for example, a distinct connection between each interface and the corresponding switch.

In order for the connection between the interface unit and the power control unit to be connected via an electrical, radio or optical connection, the main switch and the outlet switches have to be controllable using control signals. Such control may be affected by a direct connection between the interfaces and the respective switches or it may also be possible that, for example, the power control unit includes a data processing unit which receives all signals from the interface unit and controls the main switch and the outlet switches based on these signals.

However, in a preferred embodiment a data link is provided for all connections. The main switch interface is connected to the main switch via the data link and each of the outlet switch interfaces is connected to its associated outlet switch via the data link. Hence, the control signals are transmitted as digital data signals. This simplifies the connection between the interface unit and the power control unit and makes it easier to adapt the control unit to different configurations of the galley since the connection between the interface unit and the power control unit does not have to be modified if either of the interface unit and the power control unit is changed. Further, if the configuration of the galley is changed, i.e., if additional galley inserts are installed and/or existing galley inserts are removed, it may be necessary to adapt the power control unit and the interface unit. However, the connection between the two units does not require any modification.

In an exemplary preferred embodiment, the connection is established via an electrical connection in the form of an Ethernet connection or a bus line. In another exemplary preferred embodiment, the connection is a wireless radio connection such as a WiFi connection, a Bluetooth connection or a radio connection operating according to another wireless protocol. Also combinations of wireless and wirebound connections are feasible.

In a preferred embodiment the power control unit comprises a power distributor for controlling the distribution of electric power supplied via the power input onto the plurality of power outlets. The interface unit comprises a distributor interface for enabling a user to control the distribution of electrical power by the power distributor, wherein the distributor interface is connected to the power distributor via an electrical, radio or optical connection for controlling the power distributor. Using a power distributor has the advantage that the total power requirements of all galley inserts may exceed the power provided by the aircraft's power feed. The distributor advantageously enables a user to select groups of galley inserts that are simultaneously provided with power to ensure that a maximum available power threshold is not exceeded.

The power distributor is preferably a dynamic power distributor which is controllable for dynamically varying the distribution of electrical power supplied via the power input onto the plurality of power outlets. In other words, the power distributor is preferably not just a binary switch that either provides a galley insert with power or does not provide a galley insert with power but can dynamically change the power provided to each galley insert. For example, if only steam oven galley inserts shall be operated, these are provided with all the power they require. However, if at the same time coffee makers shall be operated, the steam oven galley inserts may only be provided with, e.g., 80% of the maximum power. This will increase the time it requires to heat the meals in the steam oven but enables simultaneous operation of steam ovens and coffee makers which may previously not have been possible.

It is further preferred that the dynamic power distributor is automatically controlled by a data processing unit arranged in the power control unit or the interface unit. Automatic control of the dynamic power distributor allows for rapid updates of the power control arrangement. If new galley inserts are connected to the power control unit's power outlets it is not necessary to rewire the distributor. If the power distributor is dynamically controlled using the data processing unit, it may simply be reprogrammed for delivering power as required to each of the power outlets and the galley inserts connected to the respective outlets. This does not only reduce maintenance time, it also makes it possible to locate the power control unit in a position where only the outlets are accessible but the internal structure of the power control unit is difficult to access. Hence, the power control unit can be hidden in the rear of the galley where it does not obstruct any space required for galley inserts.

It is preferred that the interface unit is connected to the power control unit via the data link, wherein the distributor interface is connected to the power distributor via the data link. As previously discussed, using a data link makes installation of the connection easier and more reliable. Further, no dedicated wiring is required for each and every connection between the interface unit and the power control unit which enables a quicker reconfiguration of both units since the connection does not need to be updated.

In a preferred embodiment the outlet switches are circuit breakers and each circuit breaker has an associated threshold. Each circuit breaker is adapted or configured to automatically switch from the enabled state to the disabled state if the electric power supplied through the respective power outlet exceeds the associated threshold. In a preferred embodiment at least one of the circuit breakers is a programmable electronic circuit breaker, wherein the associated threshold of the at least one programmable electronic circuit breaker can be controlled. Using programmable electronic circuit breakers has the advantage that replacing a galley insert with another galley insert that has different power requirements or installing additional galley inserts does not require replacement of parts used in the power control unit. The programmable electronic circuit breakers may simply be reprogrammed to meet the requirements of the respective galley inserts.

Such reprogramming could be performed using the interface unit. In a preferred embodiment the threshold of the at least one programmable electronic circuit breaker can be controlled via the associated outlet switch interface of the interface unit. This further reduces the effort required when replacing galley inserts or installing additional galley inserts.

Preferably, the interface unit comprises a touchscreen on which the interfaces of the interface unit are formed as graphical representations displayed on the touchscreen which are operable by a user via touch control. In other words, the interface unit is preferably a touch screen device such as a tablet. The interfaces to the main switch, the outlet switches and the distributor are not formed as mechanical switches but are formed by graphic representations on the screen of the tablet. This further improves the maintenance times of the interface unit since the replacement or installation of additional galley inserts does not require any modification of the structure of the interface unit. It is sufficient to reprogram the interface unit which could, for example, be done by uploading an update program to the interface unit. This further improves maintenance of the power control arrangement since it is not even necessary to replace any physical switches or labels on the interface unit when changing the galley inserts connected to the power control unit.

Providing the interface unit as a touchscreen device in the form of a tablet further has the advantage that the tablet can be easily installed, for example, in the walls delimiting the compartments of the galley. For example, the interface unit could be designed such that it can be stored in a cutout or receptacle in a wall of the galley such that it needs to be taken out of the wall for a user to access the interfaces on the interface unit. Thus, less space is occupied by the interface unit and it may be possible to install additional galley inserts in the space previously occupied by the interface unit.

It is also possible to provide a neat layout of the interface unit since not all interfaces to the main switch, all outlet switches and the distributor have to be visible at all times. It is instead possible to provide different display layouts for different purposes. For example, there may be one display layout for the power distributor, one display layout for all outlet switches and one display layout for the main switch. A user can switch between different display layouts in many different ways well-known to the skilled person, for example, via a menu displayed on the screen. It is also possible to combine physical control elements and different display elements. For example, the interface unit may comprise multiple physical buttons and each button is associated which one display layout that is shown when the associated button is pressed.

Furthermore, the interface control unit may also in an exemplary embodiment be provided with display layouts for controlling galley inserts connected to the power outlets of the power control unit. This would further reduce the number of visible control elements in the galley and allow a neat appearance of the galley. In addition, using a display such as a liquid crystal display as interface unit allows including additional functionality into the interface unit. For example, data may be read from the cabin intercommunications data system (CIDS) and displayed on the display. Other functionality that could be included into the interface unit could be control of the heating of the passenger cabin or requests issued by passenger regarding specific meals or drinks.

It is also possible to use the interface unit to record operating times of galley inserts. The operating times could be provided to maintenance personal either directly on the screen of the interface unit or it is also possible to include an external data interface for transmitting such data to a remote maintenance center. This allows for a timely maintenance of the galley inserts.

In a preferred embodiment the interface unit comprises a physical main switch interface. The physical main switch interface is connected to the main switch via a dedicated main switch control line for switching the main switch from the enabled state to the disabled state. In other words, in addition or instead of having a main switch interface that is only provided by a graphical representation on the screen of the interface unit, an additional physical main switch interface, e.g., a main switch interface with a structural button, is provided. The physical main switch interface is not connected to the power control unit via the connection used by the other switch interfaces but has its own dedicated connection to the power control unit such that the main switch can be operated even if the display unit of the interface unit or the date link should fail. The connection between the physical main switch interface and the main switch of the power control unit is preferably an electrical connection.

In another aspect the disclosure herein provides an aircraft galley comprising a power control arrangement according to any of the preceding embodiments. The advantages of the galley correspond to the advantages of the power control arrangement comprised therein.

In a preferred embodiment the aircraft galley comprises a front section or front part facing towards a user when the galley is installed in an aircraft and rear section or rear part facing away from a user when the galley is installed in the aircraft, wherein the interface unit is arranged adjacent to the front section such that a user can operate the interfaces and the power control unit is arranged adjacent to the rear section such that the power control unit is not visible to a user. Thus, the power control unit could be placed close to the power feed of the aircraft such that more space is available in the galley compartments.

In a third aspect the disclosure herein provides an aircraft comprising a galley according to any of the preceding embodiment. The advantages of the aircraft correspond to the advantages of the embodiments of the galley used therein.

BRIEF DESCRIPTION OF THE DRAWINGS

In the following an exemplary embodiment of an aircraft according to the disclosure herein comprising an exemplary embodiment of a galley according to the disclosure herein which comprises an exemplary embodiment of a power control arrangement according to the disclosure herein will described with reference to the figures, wherein.

DETAILED DESCRIPTION

Figure 1:
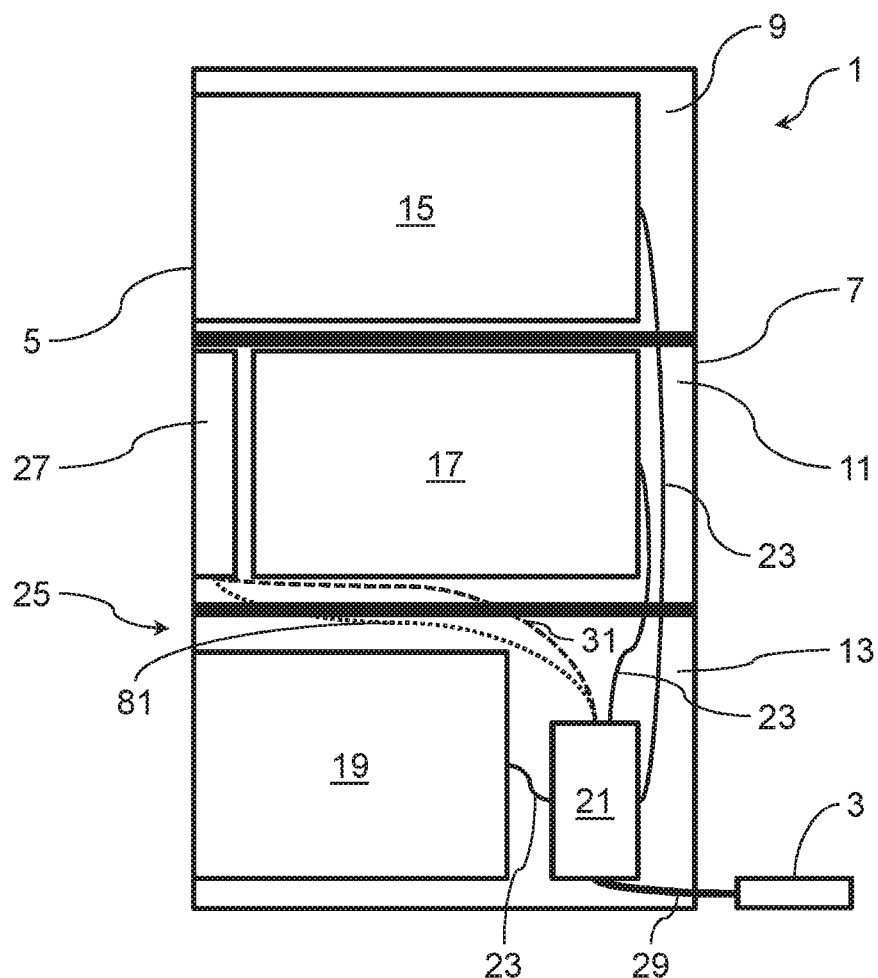
FIG. 1 shows a sectional view of an exemplary embodiment of an aircraft galley according to the disclosure herein.

FIG. 1 shows an exemplary embodiment of an aircraft galley 1 according to the disclosure herein installed in an aircraft. Of the aircraft only a power feed 3 is shown which is provided for supplying power to the galley 1. The galley 1 is shown in cross section with the cross section extending from a front part or front side 5 of the galley 1 to the rear part or rear side 7 of the galley 1. The front side 5 is that side of the galley 1 which is visible to passengers and crew members of the aircraft whereas the rear side 7 is, for example, arranged adjacent to a wall or a pressure bulkhead and, therefore, not visible to passengers and crew members.

The galley 1 comprises a plurality of compartments 9, 11, 13 in which galley inserts 15, 17, 19 are installed. In FIG. 1 only three compartments 9, 11, 13 are shown. However, it is evident to the skilled person that the galley 1 may comprise more than three compartments 9, 11, 13. In the uppermost compartment 9 a galley insert 15 in form of a refrigerator 15 has been installed. In the middle compartment 11 a galley insert 17 in form of a coffeemaker has been installed and in the lowermost compartment 13 a steam oven 19 has been installed as galley insert 19. All three galley inserts 15, 17, 19 are connected to a power control unit 21 via power lines 23. The power control unit 21 is part of an exemplary embodiment of a power control arrangement 25 according to the disclosure herein which includes in addition to the power control unit 21 also an interface unit 27. Details of the power control unit 21 and the interface unit 27 are not shown in FIG. 1 and will be described in the following with reference to the remaining figures.

As can be seen in FIG. 1, the power control unit 21 is arranged adjacent to the rear side 7 of the galley 1 and close to the power feed 3 of the aircraft. Thereby, the length of the power line 29 between the power feed 3 and the power control unit 21 can be kept short which saves weight and also saves space since the power line 29 does not need to extend all the way to the front side 5 of the galley 1 as required for prior art power control arrangements. Further, by placing the power control unit 21 at the rear end of a compartment 13 of the galley 1, the remaining space of the compartment 13 can be used for installing a galley insert 19.

The power control unit 21 is connected to the interface unit 27 via a data link 31. The data link 31 may be an electric link, a radio link or an optical link. For example, the data link 31 is embodied as an Ethernet connection. Connecting the power control unit 21 and the interface unit 27 via a data link 31 has the advantage that the connection between the two elements 21, 27 of the power control arrangement 25 does not have to be modified if either of the data control unit 21 or the interface unit 27 are modified.

Figure 2:
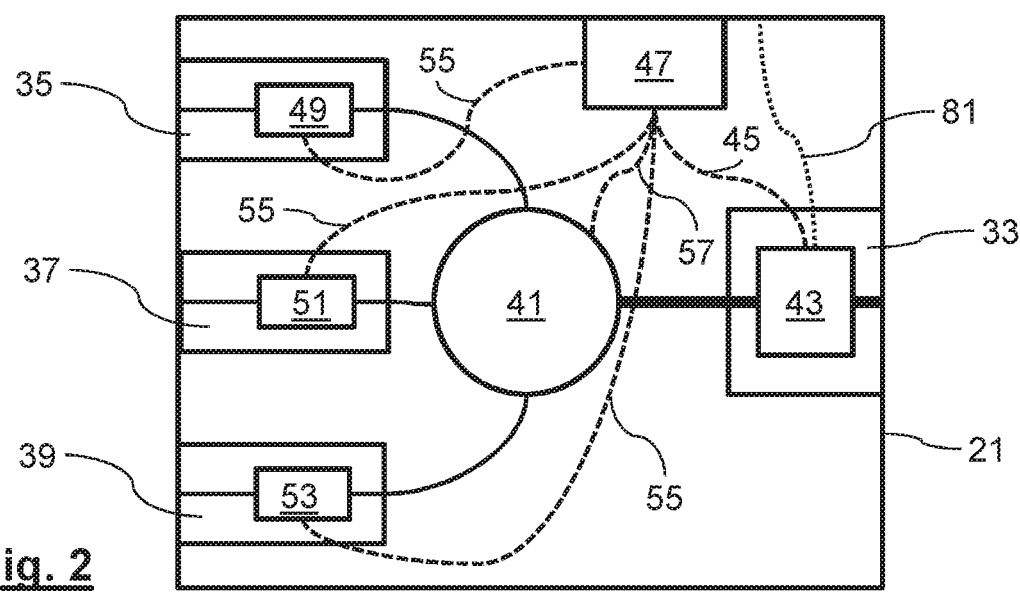
FIG. 2 shows a schematic layout of an exemplary embodiment of a power control unit.

In the following the power control unit 21 will be described in more detail with reference to FIG. 2. In all Figures like elements will be designated with like reference numerals. The power control unit 21 comprises a power input 33, three power outlets 35, 37, 39 and a power distributor 41.

The power input 33 is provided for connecting the power control unit 21 to the power feed 3 of the aircraft. The power input 33 includes a main switch 43 which is provided for selectively enabling and disabling the supply or electrical power from the power feed 3 through the power input 33. The main switch 43 is connected via a control line 45 to a data processing unit 47 which is also part of the power control unit 21. The data processing unit 47 can control switching of the main switch 43 between an enabled state in which electrical power can be supplied through the power input 33 and a disabled state in which no electrical power can be supplied through the power input 33. The control line 45 is preferably a digital data link but may also be embodied as an analog connection.

In the exemplary embodiment the power control unit 21 comprises only three power outlets 35, 37, 39. It is evident for the skilled person that the power control unit 21 may comprise more than three power outlets 35, 37, 39. Each of the three power outlets 35, 37, 39 comprises an outlet switch 49, 51, 53 in the form of a programmable electronic circuit breaker 49, 51, 53. Each of the outlet switches 49, 51, 53 is connected via a data line 55 to the data processing unit 47. Via the data lines 55 the data processing unit 47 can control the outlet switches 49, 51, 53. The data processing unit 47 can, for example, switch the outlet switches between a disabled state and an enabled state, wherein in the disabled state no electric power can be supplied to a galley insert connected to the respective power outlet 35, 37, 39 and in the enabled state electric power can be supplied to a galley insert connected to the respective power outlet 35, 37, 39. Since the outlet switches 49, 51, 53 are provided as circuit breakers, they automatically switch from the enabled state to a disabled state if the power drawn through the power outlet 35, 37, 39 exceeds a predetermined threshold. The threshold can be modified using the data processing unit 47. This advantageously allows adapting the power control unit 21 if different galley inserts are connected to a power outlet 35, 37 39 that have different power requirements without having to replace any parts in the power control unit.

The power distributor 41 is a dynamic power distributor 41 which is controlled by the data processing unit 47. To this end the power distributor is connected to the data processing unit 47 via a data line 57. The power distributor is provided for distributing the electrical power received from the power feed 3 through the power input 33 onto the power outlets 35, 37 39. In particular, the power distributor 41 is provided for selecting subsets of power outlets 35, 37, 39 which are supplied with power and other subsets of power outlets 35, 37, 39 which are not supplied with power. Since the power distributor 41 is a dynamic power distributor, it is not only possible to either supply power to a power outlet 35, 37, 39 or not supply power to a power outlet 35, 37, 39, but it is also possible to limit the maximum power supplied to a power outlet 35, 37, 39. For example, it is possible to limit the power provided to a specific power outlet 35, 37, 39 to 80% of the maximum power required by the galley insert connected to the specific insert. Thereby, it is possible to operate more power outlets at the same time as if each power outlet would always be provided with the maximum power it requires.

The power distributor 41 which can be referred to as the galley load management unit is also controlled using the data processing unit 47. Hence, the data processing unit 41 can be used to control which power outlets 35, 37, 39 are supplied power at all and also what is the maximum power that may be provided to a specific power outlet 35, 37, 39.

All switches 43, 49, 51, 53 and the power distributor 41 of the power control unit 21 can be controlled via the data processing unit 47. While some of the control commands may be generated automatically by the data processing unit 47, other control commands may be generated by the data processing unit 47 in response to data received from the interface unit 27. To this end, the data processing unit 47 is connected to the interface unit 27 via the data link 31. The data link 31 is connected directly to the data processing unit 47 in the exemplary embodiment shown in the Figures.

Figure 3:
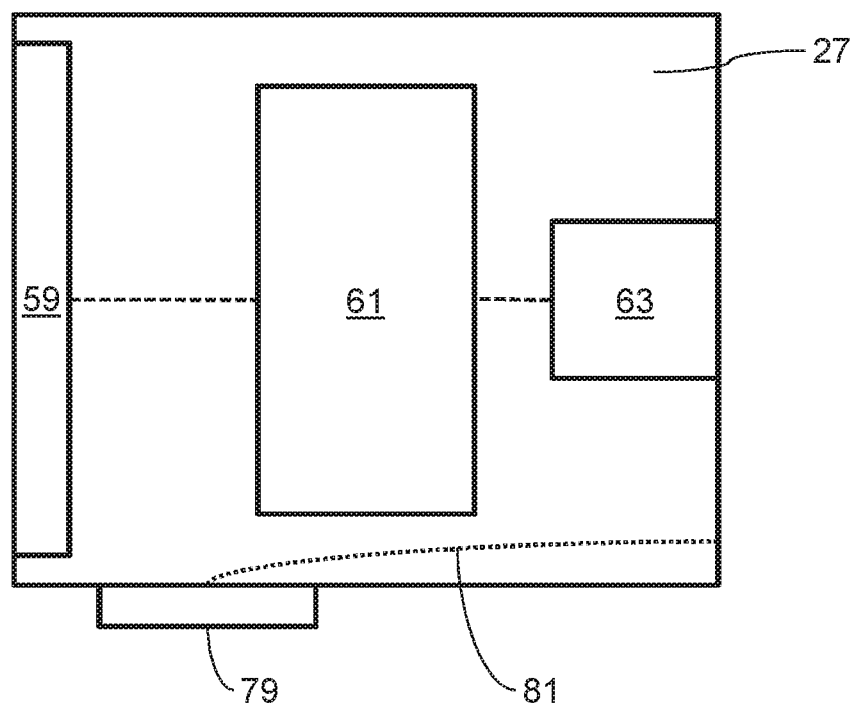
FIG. 3 shows a schematic layout of an exemplary embodiment of an interface unit.
Figure 4:
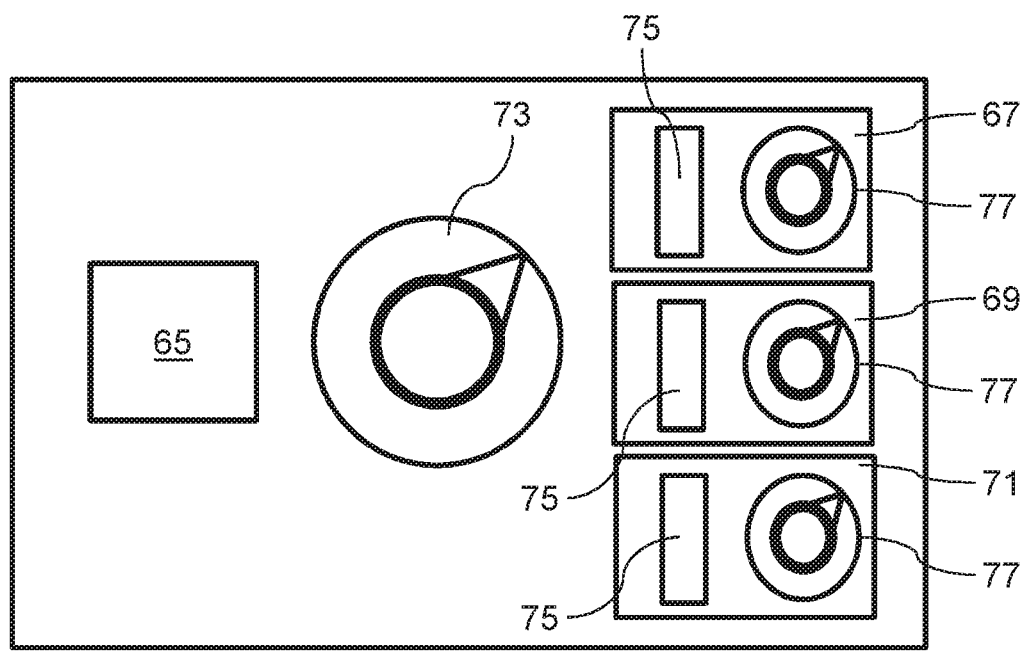
FIG. 4 shows a schematic drawing of an exemplary embodiment of a display layout of an exemplary embodiment of an interface unit.

An exemplary embodiment of an interface unit 27 will next be described with reference to FIG. 3 which shows a schematic layout of the interface unit 27. The interface unit comprises a display device 59 in form of a touchscreen 59, a data processing unit 61 and a data link connector 63. The interface unit 27 can have the form of a flat tablet, i.e., its outer dimensions are largely determined by the dimensions of the touchscreen 59 with a limited thickness of the interface unit 27 perpendicular to the extension plane of the touchscreen 59. The dimensions of the interface unit 27 may be chosen such that the interface unit 27 can be placed in a recess formed in wall of the galley 1 separating two compartments to reduce the space required for installing the power control arrangement 25 and increasing the number of galley inserts that can be installed in the galley 1.

The data processing unit 61 of the interface unit 63 controls operation of the interface unit 27. For example, the data processing unit 61 controls the content shown on the display device 59 and determines the interaction of a user with the touchscreen 59. The data processing unit 61 also determines from the interaction of the user with the touchscreen 59 which commands or control signals are to be transmitted to the power control unit 21 via the data link connector 63 to which the data link 31 is connected. The data processing unit 61 also receives data from the power control unit 21 and stores and processes the received data which may be displayed on the display device 59. As has already become evident from the foregoing description of the data processing unit 61, the term data processing unit 61 does not only refer to a single integrated circuit but may include all means or structure necessary for operating the interface unit 27 such as display drivers, memories and other electronic components. The same applies to the data processing unit 47 of the power control unit 21.

The interface unit 27 comprises a main switch interface 65, three outlet switch interfaces 67, 69, 71 and a distributor interface 73. The interfaces 65, 67, 69, 71, 73 are not structural elements of the interface unit 27 but graphical elements on the display device 59 of the interface unit 27. Since the interfaces 65, 67, 69, 71, 73 are not structural elements but only graphical elements they do not have to be visible at all times on the display device. Rather, for an interface unit 27 to comprise a specific interface, it is sufficient that the interface comprises code that allows display of the interface on the display device 59 and providing the functionality of the interfaces.

The main switch interface 65 shown is represented by a button that can be tapped by a user for switching the main switch 43 of the power control unit 21 between an enabled state and a disabled state. When a user taps the main switch interface 65, the tap is recorded by the touchscreen 59 and processed by the data processing unit 61 of the interface unit 27. The data processing unit 61 converts the tap into a digital signal that is transmitted through the data link connector 63 and the data link 31 to the data processing unit 47 of the power control unit 21. Here, the digital signal is received and used to control the state of the main switch, i.e., to switch the main switch between the enabled and the disabled state and vice versa. The data link 31 is also used for transmitting a signal back from the power control unit 21 to the interface unit 27 such that the way the main switch interface 65 is displayed on the display device reflects the state of the main switch 43.

Each of the outlet switch interfaces is associated with one of the power outlets 35, 37, 39 and comprises a button 75 for toggling the outlet switch 49, 51, 53 of the respective power outlet 35, 37, 39 between a disabled and an enabled state. The state of an outlet switch 49, 51, 53 is reflected by the way the respective button is displayed on the on the display device. For example, if one of the outlet switches (which are formed as circuit breakers) cuts the power provided to a galley insert, the button 75 of the associated outlet interface 67, 69, 71 will changes its appearance to reflect the change of the state of the outlet switch 49, 51, 53. Each of the outlet switch interfaces 67, 69, 71 further comprises a graphic representation of a rotary switch 77. The rotary switches are used to adjust the threshold at which the associated circuit breaker 49, 51, 53 cuts the power provided to a power outlet 35, 37, 39.

Finally, the distributor interface 73 is shown as a rotary switch which can be used to select different ways of distributing power between the galley inserts 15, 17, 19. For example, a user can selected via the distributor interface 73 that only two of the galley inserts 15, 17, 19 are provided with power or that all three galley inserts 15, 17, 19 are provided with power. If the power available to a galley insert 15, 17, 19 should not be sufficient to supply all three galley inserts 15, 17, 19 with the maximum power required, one of them may only receive 80% of the maximum power it requires without this being notified to a user of the interface unit 27.

Using an interface unit 27 in the form of a display device 59 and a data processing unit 61 does not only have the advantage that is takes up little space in the galley 1, it also has the advantage that it can be easily reconfigured using a software update or directly by maintenance personal if the galley inserts 15, 17, 19 are exchanged or if additional galley inserts are installed.

In addition to the switch interfaces 65, 67, 69, 71, 73 which are formed as graphical representations on the display device 59, the interface unit 27 further comprises a physical main switch interface 79, i.e., a structural button 79 which can be directly operated by a user without having to interact with the display device 59. The physical main switch interface 79 is provided in addition to the virtual main switch interface 65 which is only a graphical representation on the display device 59. However, it may also be provided instead off the virtual main switch interface 65 and form the only main switch interface 79. The physical main switch interface 79 is connected via a direct dedicated main switch control line 81 to the main switch 43. This enables a user to operate the main switch 43 via the physical main switch interface 79 even if the display device 59 should fail and, in particular, without having to interact with the display device 59 at all.

While at least one exemplary embodiment of the present invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A power control arrangement for an aircraft galley comprising a power control unit and an interface unit, wherein the power control unit comprises a power input and a plurality of power outlets and wherein the interface unit comprises a main switch interface and a plurality of outlet switch interfaces,
    wherein the power input comprises a main switch and is provided for connecting the power control unit to an electric power feed of an aircraft for supplying electric power from the electric power feed of the aircraft to the power control unit, wherein the main switch is selectively switchable between an enabled state and a disabled state, wherein in the enabled state electric power can be supplied from the electric power feed though the power input to the power outlets, and in the disabled state electric power cannot be supplied from the electric power feed through the power input to the power outlets,
    wherein each of the plurality of power outlets comprises an outlet switch and is provided for connecting a galley insert to the power control unit such that a galley insert connected to one of the plurality of power outlets can be supplied with electric power from the power control unit, wherein each outlet switch is switchable between an enabled state and a disabled state, wherein in the enabled state of each outlet switch electric power can be supplied from the power control unit through the respective power outlet to a galley insert connected to the respective power outlet, and in the disabled state of each outlet switch electric power cannot be supplied from the power control unit though the respective power outlet to a galley insert connected to the respective power outlet,
    wherein the main switch interface is configured for enabling a user to control switching of the main switch between the enabled state and the disabled state,
    wherein each outlet switch interface is associated with one of the plurality of outlet switches and configured to allow a user to control switching of the associated outlet switch at least from the disabled state to the enabled state,
    wherein the interface unit is arranged remote from the power control unit, and
    wherein the main switch interface is connected to the main switch via an electrical, radio or optical connection for controlling switching of the main switch and each of the outlet switch interfaces is connected to the associated outlet switch via an electrical or optical connection for controlling switching of the associated outlet switches.

2. The power control arrangement according to claim 1, wherein the interface unit is connected to the power control unit via a data link, wherein the main switch interface is connected to the main switch via the data link or each of the outlet switch interfaces is connected to its associated outlet switch via the data link.

3. The power control arrangement according to claim 1, wherein the power control unit comprises a power distributor for controlling distribution of electric power supplied via the power input onto the plurality of power outlets, and
    wherein the interface unit comprises a distributor interface for enabling a user to control the distribution of electrical power by the power distributor, wherein the distributor interface is connected to the power distributor via an electrical, radio or optical connection for controlling the power distributor.

4. The power control arrangement according to claim 3, wherein the power distributor is a dynamic power distributor which is controllable for dynamically varying the distribution of electrical power supplied via the power input onto the plurality of power outlets.

5. The power control arrangement according to claim 4, wherein the dynamic power distributor is automatically controlled by a data processing unit arranged in the power control unit or the interface unit.

6. The power control arrangement according to claim 3, wherein the interface unit is connected to the power control unit via the data link, wherein the distributor interface is connected to the power distributor via the data link.

7. The power control arrangement according to claim 1, wherein the outlet switches are circuit breakers and each circuit breaker has an associated threshold, wherein each circuit breaker can automatically switch from the enabled state to the disabled state if the electric power supplied through the respective power outlet exceeds the associated threshold.

8. The power control arrangement according to claim 7, wherein at least one of the circuit breakers is a programmable electronic circuit breaker, wherein the associated threshold of the at least one programmable electronic circuit breaker can be controlled.

9. The power control arrangement according to claim 8, wherein the threshold of the at least one programmable electronic circuit breaker can be controlled via the associated outlet switch interface of the interface unit.

10. The power control arrangement according to claim 1, wherein the interface unit comprises a touchscreen on which interfaces of the interface unit are formed as graphical representations displayed on the touchscreen which are operable by a user via touch control.

11. The power control arrangement according to claim 1, wherein the interface unit comprises a physical main switch interface, wherein the physical main switch interface is connected to the main switch via a dedicated main switch control line for switching the main switch from the enabled state to the disabled state.

12. An aircraft galley comprising a power control arrangement comprising a power control unit and an interface unit, wherein the power control unit comprises a power input and a plurality of power outlets and wherein the interface unit comprises a main switch interface and a plurality of outlet switch interfaces,
    wherein the power input comprises a main switch and is provided for connecting the power control unit to an electric power feed of an aircraft for supplying electric power from the electric power feed of the aircraft to the power control unit, wherein the main switch is selectively switchable between an enabled state and a disabled state, wherein in the enabled state electric power can be supplied from the electric power feed though the power input to the power outlets, and in the disabled state electric power cannot be supplied from the electric power feed through the power input to the power outlets, wherein each of the plurality of power outlets comprises an outlet switch and is provided for connecting a galley insert to the power control unit such that a galley insert connected to one of the plurality of power outlets can be supplied with electric power from the power control unit, wherein each outlet switch is switchable between an enabled state and a disabled state, wherein in the enabled state of each outlet switch electric power can be supplied from the power control unit through the respective power outlet to a galley insert connected to the respective power outlet, and in the disabled state of each outlet switch electric power cannot be supplied from the power control unit though the respective power outlet to a galley insert connected to the respective power outlet, wherein the main switch interface is configured for enabling a user to control switching of the main switch between the enabled state and the disabled state, wherein each outlet switch interface is associated with one of the plurality of outlet switches and configured to allow a user to control switching of the associated outlet switch at least from the disabled state to the enabled state, wherein the interface unit is arranged remote from the power control unit, and wherein the main switch interface is connected to the main switch via an electrical, radio or optical connection for controlling switching of the main switch and each of the outlet switch interfaces is connected to the associated outlet switch via an electrical or optical connection for controlling switching of the associated outlet switches.

13. The aircraft galley according to claim 12, wherein the aircraft galley comprises a front section facing towards a user when the aircraft galley is installed in an aircraft and a rear section facing away from a user when the aircraft galley is installed in the aircraft, wherein the interface unit is arranged adjacent to the front side such that a user can operate the interfaces and the power control unit is arranged adjacent to the rear side such that the power control unit is not visible to a user.

14. An aircraft comprising an aircraft galley according to claim 12.

* * * * *